United States Patent [19]

Walters

[11] 4,073,548
[45] Feb. 14, 1978

[54] SEALING SYSTEM FOR A ROTARY ROCK BIT

[75] Inventor: D. F. Walters, Dallas, Tex.

[73] Assignee: Dresser Industries, Inc., Dallas, Tex.

[21] Appl. No.: 737,634

[22] Filed: Nov. 1, 1976

[51] Int. Cl.² ............................................. F16C 33/76
[52] U.S. Cl. ..................................... 308/8.2; 175/228; 308/36.1; 308/187.1
[58] Field of Search ............. 308/8.2, 36.1, 78, 187.1, 308/187; 175/228; 277/165, 176, 92, 94, 95, 96

[56] References Cited

U.S. PATENT DOCUMENTS

| 3,735,825 | 5/1973 | Keller | 175/228 |
| 3,761,145 | 9/1973 | Schumacher, Jr. | 308/187.1 X |
| 3,944,306 | 3/1976 | Neilson | 308/36.1 X |

*Primary Examiner*—Trygve M. Blix
*Assistant Examiner*—Douglas C. Butler
*Attorney, Agent, or Firm*—Eddie E. Scott

[57] ABSTRACT

A sealing system acts as a barrier to the drilling fluid, pulverized cuttings and other materials in the borehole to prevent the materials from entering the bearing area of a rotary rock bit. The bit body and the base of the cone cutter cooperate to retain the seal unit. The seal is located in a groove and an effective seal is provided without reducing the bearing capacity of the bit's bearing system. The sealing system allows excessive pressures in the lubricant to be relieved.

3 Claims, 2 Drawing Figures

SEALING SYSTEM FOR A ROTARY ROCK BIT

BACKGROUND OF THE INVENTION

The present invention relates to the art of earth boring and, more particularly, to a rotary rock bit with improved means for sealing the bearings from materials in the borehole. The present invention is especially adapted for use in that type of rotary rock bit popularly known as a three-cone bit; however, its use is not restricted thereto, and the present invention can be used in other types of rotary rock bits.

A three-cone rotary rock bit is adapted to be connected as the lowest member of a rotary drill string. As the drill string is rotated, the bit disintegrates the earth formations to form an earth borehole. The three-cone rotary rock bit includes three individual arms that extend angularly downward from the main body of the bit. The lower end of each arm is shaped to form a spindle or bearing pin. A cone cutter is mounted upon each bearing pin and adapted to rotate thereon. Individual bearing systems promote rotation of the cone cutters. The bearing systems have traditionally been roller bearings, ball bearings, friction bearings, or a combination of the aforementioned bearings. The cone cutters include cutting structure on their outer surfaces that serve to disintegrate the formations as the bit is rotated. Various forms of seals have been provided between the cone cutter and the arms upon which they are mounted; however, the prior art seals have in many instances proven to be less than satisfactory.

The rotary rock bit must operate under very severe conditions, and the size and geometry of the bit is restricted by the operating characteristics. At the same time, the economics of petroleum production demand a longer lifetime and improved performance from the bit. In attempting to provide an improved bit, new and improved materials have been developed for the cutting structure of the cones. They have provided a longer useful lifetime for the cones. This has resulted in the bearing system of the bit being generally the first to fail during the drilling operation. Consequently, a need exists for improved bearing systems to extend the useful lifetime of the bit. In attempting to improve the bearing system, various seal systems have been provided to maintain the bearing area free of harmful materials. In attempting to provide an improved bearing system incorporating an improved sealing system, great care should be taken that the overall capacity of the bearing system is not reduced.

When a sealed bearing rotary rock bit is lowered into a well bore, the environmental pressure surrounding the bit increases at the rate of approximately ½ pound per square inch for each foot of depth. This means that at a depth of 10,000 feet the hydrostatic pressure on the outside of the bit could be 5,000 psi or more because of the weight of the drilling fluid in the well bore above the bit. In order for a lubrication system to function properly at the elevated down hole pressures, some means must be provided to equalize the internal pressure of the lubricant in the lubrication system with the hydrostatic pressure of the drilling fluid in the well bore. Pressure equalization has previously been accomplished by closing one end of the lubricant reservoir with a flexible membrane and venting the portion of the reservoir on the outer side of the membrane to a port on the surface of the bit. This system has only been partially successful because the flexible membrane tends to rupture under large pressure differentials and the pressure differential across the seal tends to push the seal element into a position where it is damaged by other elements of the bit.

A wide variety of other environmental conditions also affect the performance of the pressure equalizing system. For example, the temperature will rise as the well bore penetrates deeper into the earth and temperatures of up to 325° F are presently being encountered. Deep wells now being drilled are expected to result in environmental temperatures of up to 400° F and the drilling of steam wells results in environmental temperatures as high as 550° F. The elevated temperatures have an adverse effect on the lubricant, the structural elements of the lubrication system, the structural elements of the pressure equalizing system and a substantial increase in the pressure of the lubricant within the lubricant reservoir is generally encountered.

DESCRIPTION OF PRIOR ART

In U.S. Pat. No. 3,735,825 to W. S. Keller, patented May 29, 1973, a pressure equalizing system for rock bits is shown. A lubricant reservoir is positioned in each arm of a three-cone rotary rock bit to provide lubricant to bearings located between the bit's rotary cone cutters and the bearing shaft upon which the cutters rotate. A seal is positioned between the cutters and the bearing shaft to retain lubricant in the bearing area and to prevent borehole fluid and debris from entering the bearing area. A pressure equalizing passage provides communication between the lubricant reservoir and the outside of the bit. A two-way valve is positioned in the pressure equalizing passage to prevent excessive pressure differential from building up between lubricant in the lubricant reservoir and fluid outside of the bit by allowing lubricant from the lubricant reservoir to escape to the outside of the bit and allowing fluid outside of the bit to enter the lubricant reservoir.

In U.S. Pat. No. 3,476,195 to E. M. Galle, patented Nov. 4, 1969, a sealed bearing rotary rock bit is shown that includes a lubricant reservoir and a flexible membrane that encloses one end of the lubricant reservoir for equalizing the internal pressure of lubricant in the lubricant reservoir with the hydrostatic pressure of drilling fluid in the well bore. A check valve is provided which operates at low pressure to permit flow out of the lubricant reservoir to the outside of the bit but blocks any flow in the reverse direction.

In U.S. Pat. No. 3,719,241 to W. R. Bell, patented Mar. 6, 1973, a free breathing lubrication system for sealed bearing rock bits is shown. Three individual reservoirs are positioned in a three-cone rotary rock bit with one of the reservoirs in each of the arms of the bit for supplying lubricant to the bit bearing systems located between each of the three individual cone cutters and the bearing shafts upon which they rotate. A seal is positioned between each of the cone cutters and its bearing shaft to prevent the lubricant from escaping into the borehole and to prevent borehole fluids and debris from entering the bearing area. A passageway extends from each of the lubricant reservoirs to the exterior of the bit and a free breathing porous filter plug is positioned in each of the passageways thereby equalizing the internal pressure of lubricant in the lubricant reservoir and the hydrostatic pressure of drilling fluid in the well bore.

In U.S. Pat. No. 3,397,928 to E. M. Galle, patented Aug. 20, 1968, a seal means for drill bit bearings is shown. The seal means comprises a shaft rigidly secured to a drill bit body and having a bearing surface formed thereon; a cutter element rotatably mounted to said shaft and having a bearing surface thereon that opposes and engages the bearing surface on said shaft, one of said surfaces having a circumferential groove therein; and a resilient packing ring positioned within said groove, with said packing ring, said groove and an opposing surface being sized such that upon assembly of the cutter element upon the shaft the cross sectional thickness of said ring is compressed by not less than substantially ten percent of its thickness prior to assembly of the cutter element upon the shaft.

In U.S. Pat. No. 3,127,942 to W. J. Neilson, patented Apr. 7, 1974, a well drilling bit is shown having a body attachable to a drill string, a journal on the body, a cutter rotatable on the journal, a bearing between the journal and the cutter, a ball plug extending through the journal largely closing the aperture through which parts of the bearing were fed through the journal from the exterior of the body to between the journal and cutter, said ball plug having a passage formed therein leading to the bearing, there being a first passage in the body leading from the exterior surface of the body adjacent the outer end of the ball plug to the passage in the ball plug through which lubricant can be forced into the bearing, an O-ring recessed in the outer end face of the cutter bearing against the body around the journal and around the bearing, there being a second passage formed in the body leading from the exterior surface of the body adjacent the outer end of the ball plug to the bearing at a point remote from where the passage in the ball plug discharges into the bearing and within the O-ring, and means closing the outer end of the second passage.

In U.S. Pat. No. 2,676,790 to M. F. Turner, patented Apr. 27, 1954, a rock bit is shown having a lubricant fitting which makes possible the insertion of lubricant into and around anti-friction bearings, to enable the packing of the bearing chamber under pressure, and while under pressure, to seal the lubricant chamber against loss of lubricant and to exclude drilling fluid, the pressure of which might exceed the pressure within the lubrication chamber of the bearings.

SUMMARY OF THE INVENTION

The present invention provides an improved rotary rock bit having a sealing system which will act as a barrier to the drilling fluid, pulverized cuttings and other materials in the borehole to prevent the materials from entering the bearing area. A wedge-shaped groove holds a seal unit between two surfaces. Lubricant pressure in the bearing area may be relieved by clearance within the wedge-shaped groove. Pressure outside the cone causes the seal to move into the wedge to maintain a seal against outside pressure. The wedge-shaped groove provides for relieving pressure in an outward direction if pressure is too great, while providing a positive seal against inward pressure. The invention seals against fluctuating pressures while minimizing seal wear and damage and permits some amount of contained volume change with a minimum amount of seal deformation and wear.

The above and other features and advantages of the present invention will become apparent upon consideration of the following detailed description of the invention when taken in conjunction with the accompanying drawings.

DETAILED DESCRIPTION OF THE INVENTION

Figure 1:
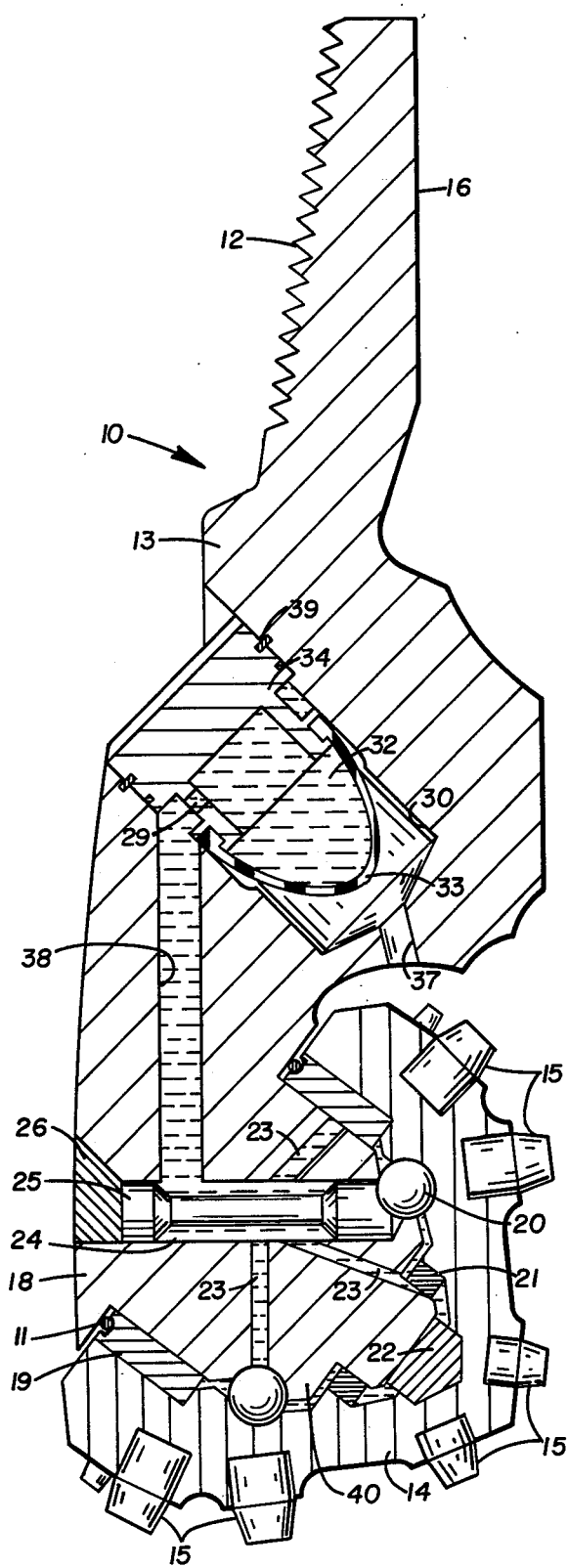
FIG. 1 is an illustration of a rotary rock bit constructed in accordance with the present invention.

Referring now to FIG. 1, a sectional view of one arm 18 of a rotary rock bit 10 is shown. It is to be understood that the structure of the other arms are substantially identical to the arm 18. A cutter 14 is rotatably positioned on a journal portion 40 of the arm 18 and adapted to disintegrate the earth formations as the bit 10 is rotated. The cutting structure 15 on the surface of cutter 14 contacts and disintegrates the formations in a manner that is well known in the art. The cutting structure 15 is shown in the form of tungsten carbide inserts. However, it is to be understood that other cutting structures such as steel teeth may be used as the cutting structure on the cone cutter 14.

The body 13 of bit 10 includes an upper threaded portion 12 that allows the bit 10 to be connected to the lower end of a rotary drill string (not shown).

The bit 10 also includes a central passageway 16 extending along the central axis of the bit to allow drilling fluid to enter from the upper section of the drill string (not shown) immediately above and pass downward to the bottom of the well bore to flush cuttings and drilling debris from the well bore.

The journal portion of arm 18 consists of the bearing pin 40 upon which the cutter 14 is mounted. A plurality of bearing systems are located in the bearing area between the cutter 14 and the bearing pin 40. The bearing systems in the bearing area include an outer friction bearing 19, a series of ball bearings 20, an inner friction bearing 21, and a thrust button 22. A seal 11 is positioned between the cutter 14 and the bearing pin 40. This seal retains lubricant in the bearing area around the bearing systems and prevents any materials in the well bore from entering the bearing area.

Passageways 23 and 24 are provided to allow lubricant to be transmitted to the bearing systems. The passageway 24, as shown, also allows the balls that make up the ball bearing system 20 to be inserted into position after the cone cutter 14 is placed on the bearing pin 18. The series of ball bearings 20 serves to lock the cone cutter 14 on bearing pin 18. After the balls are in place, a plug 25 is inserted into the passageway 24 and welded therein by weld 26. Plug 25 has a reduced diameter throughout the major portion of its length to allow lubricant to be transmitted to the bearing area. The additional passageways 23 extend from passageways 24 to the bearing area to insure a sufficient supply of lubricant to bearings 19, 20, 21, and 22.

A bore 30 extends into the arm 13 from the surface of the bit body. A passage 38 extends from the bore 30 to the passageway 24. A lubricant reservoir 32 is located in the bore 30. The lubricant reservoir 32 is located between a flexible diaphragm 33 and a metal canister 34. An O-ring seal prevents borehole fluid from by-passing the upper portion of the canister 34 and lubricant within the lubricant reservoir 32 from escaping into the borehole. The flexible diaphragm 33 prevents lubricant in the lubricant reservoir 32 from escaping into the bore 30 and fluid in the borehole that has entered bore 30 through passage 37 from entering the lubricant reservoir 32. Lubricant within the lubricant reservoir 32 is channeled into the passage 38 through opening 29 and is directed to the bearings.

Figure 2:
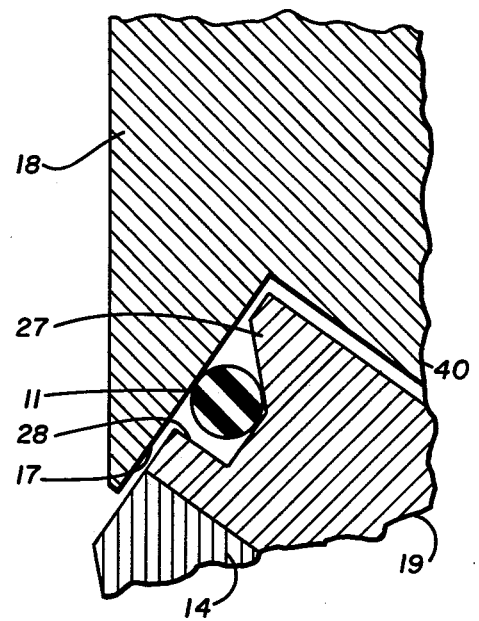
FIG. 2 is an enlarged view of a portion of the bit shown in FIG. 1.

Referring now to FIG. 2, an enlarged view of a portion of the arm 18, the cone 14 and seal unit 11 is shown. Prior art sealing systems between a rolling cone cutter and the bearing pin generally provided a symmetrical groove which was generally located about the axis of the bearing pin or in the cone cutter. The present invention provides a wedge shaped groove which will relieve pressure in an outward direction while providing a positive seal against inward pressure. This prevents contamination of the lubricant by borehole fluids and at the same time, allows relief of internal pressure build up in the lubricant.

The seal unit 11 is positioned between a surface 17 on the arm 18 and a groove in the bearing portion of the cone cutter 14. The groove includes a wedge surface 27 and a substantially perpendicular surface 28. The pressure of fluid outside the bit 10 will tend to force the seal 11 into the wedge created by the surface 27 on the cone 14 and the surface 17 on the arm 18. Internal pressure of lubricant within the bit will tend to force the seal 11 outward in the groove toward the surface 28 allowing escape of volume within the bit and the relief of internal pressures.

The structural details of an earth boring bit 10 constructed in accordance with the present invention having been described, the operation of the bit 10 will now be considered with reference to FIGS. 1 and 2. The present invention provides a seal 11 in the cone mouth of the bit which will act as a barrier to pulverized cuttings, the fluid and other materials in the borehole to prevent these materials from entering the bearing area through the cone mouth opening, thus providing an uncontaminated environment for the metal bearing elements and eliminating the abrasive wearing action of foreign materials in the bearing area. The lubricant is retained within the bit 10 to assure a long life time for the bearing systems. Internal pressure within the lubricant inside the bit 10 will move the seal 11 outward in the groove and allow the escape of internal volume thereby reducing internal pressure.

The lubrication system of the bit 10 is filled with a suitable lubricant and the area above the flexible diaphragm 33 is completely filled with the lubricant. The flexible diaphragm 33 seals the lower end of the lubricant reservoir and is held in place by the cap 34. Bit 10 will be lowered into a well bore until the cutter 14 contacts the earth formations at the bottom of the borehole. The hydrostatic pressure of fluid in the well bore is substantial and a pressure differential between the pressure of the lubricant inside of the bit 10 and the pressure of fluid inside the borehole would ordinarily develop. The lubrication system of the bit 10 allows the pressure of fluid in the well bore to be transmitted to the lubricant reservoir through passage 37 and the pressures are generally equalized as the bit 10 is moved through the borehole. Lubricant from the lubricant reservoir passes through passages 38, 24, and 23 and is transmitted to the bearing systems.

The bit 10 is rotated and thrust downward, thrusting the cutter 14 against the earth formations. Continued rotation with the weight of the drill string applying a thrust force to the bit 10, causes the cutters to disintegrate the formations and form the desired borehole. The seal 11 serves to prevent drill cuttings from entering the bearing area and under normal operating conditions contains the lubricant inside the bit 10. Should the pressure of lubricant within the bit 10 rise to elevated levels the seal 11 will be moved outward in the groove to allow the relief of pressure build up.

The embodiments of an invention in which an exclusive property or privilege is claimed are defined as follows:

1. A drill bit for drilling in a fluid filled borehole, comprising:
   a bit body, said bit body including a bearing pin;
   a roller cutter adapted to be rotatably mounted on said bearing pin;
   bearing means supporting said roller cutter on said bearing pin;
   a seal element located between said bit body and said roller cutter;
   a lubricant reservoir in said bit body;
   lubricant passages extending from said lubricant reservoir to said bearing means;
   lubricant in said lubricant reservoir, lubricant passages and between said bearing pin and roller cutter;
   pressure equalization means within said lubricant reservoir for pressure equalization of said lubricant and said fluid in said borehole, said pressure equalization means encountering volume expansion of said lubricant; and
   a groove for retaining said seal element, said groove having a wedge shaped sidewall surface that allows the volume expansion of said lubricant to move said seal element outward in said wedge.

2. An earth boring bit for drilling in a fluid filled borehole, comprising:
   an earth boring bit body, said earth boring bit body including a bearing pin;
   a roller cutter rotatably mounted on said bearing pin;
   an annular seal element positioned over said bearing pin and located between said earth boring bit body and said roller cutter;
   a lubricant reservoir in said bit body;
   lubricant passages extending from said lubricant reservoir to said bearing means;
   lubricant in said lubricant reservoir, lubricant passages and between said bearing pin and roller cutter;
   pressure equalization means within said lubricant reservoir for pressure equalization of said lubricant and said fluid in said borehole, said pressure equalization means encountering volume expansion of said lubricant; and
   a groove for retaining said seal element, said groove having a wedge shaped sidewall, wherein the volume expansion of said lubricant moves said seal element outward in said wedge.

3. An earth boring bit for boring in a fluid filled borehole, comprising:
   a bit body;
   a roller cutter rotatably mounted on said bit body, said roller cutter having a central axis;
   an O-ring seal positioned between the roller cutter and the bit body;
   a lubricant retained within the earth boring bit;
   pressure equalization means within said earth boring bit for pressure equalization of said lubricant and said fluid in said borehole, said pressure equalization means encountering volume expansion of said lubricant; and
   a groove for retaining said O-ring seal, said groove having a sloping sidewall sloping toward the central axis of the roller cutter whereby material in the well bore will force the O-ring seal into the wedge surface and internal pressure of lubricant within the bit will force the O-ring seal outward from the wedge surface.

* * * * *